US008351885B2

(12) United States Patent
Dubash et al.

(10) Patent No.: US 8,351,885 B2
(45) Date of Patent: Jan. 8, 2013

(54) AUTO-TUNING SYSTEM FOR AN ON-CHIP RF FILTER

(75) Inventors: Noshir Dubash, Chandler, AZ (US); Jeffrey E. Koeller, Mesa, AZ (US); Daniel Babitch, San Jose, CA (US)

(73) Assignee: CSR Technology Inc., San Jose, CA (US)

( * ) Notice: Subject to any disclaimer, the term of this patent is extended or adjusted under 35 U.S.C. 154(b) by 0 days.

(21) Appl. No.: 13/284,033

(22) Filed: Oct. 28, 2011

(65) Prior Publication Data

US 2012/0274427 A1 Nov. 1, 2012

Related U.S. Application Data

(62) Division of application No. 12/341,551, filed on Dec. 22, 2008, now Pat. No. 8,073,414.

(60) Provisional application No. 61/076,598, filed on Jun. 27, 2008.

(51) Int. Cl.
*H04B 1/18* (2006.01)

(52) U.S. Cl. .................. 455/180.3; 455/150.1; 455/341; 455/307; 455/166.2; 375/295; 375/297; 345/204; 323/316; 342/357.25; 342/357.52; 342/357.75

(58) Field of Classification Search ............... 455/180.3, 455/150.01, 341, 307, 166.2; 375/295, 297; 331/16, 44, 36 C, 117 R, 177 V, 179; 257/321, 257/595, E27.048; 342/357.29, 357.52, 357.62, 342/357.75, 357.77; 345/204; 323/316
See application file for complete search history.

(56) References Cited

U.S. PATENT DOCUMENTS

| | | | |
|---|---|---|---|
| 4,509,203 A | 4/1985 | Yamada |
| 5,663,734 A | 9/1997 | Krasner |
| 5,663,735 A | 9/1997 | Eshenbach |
| 5,781,156 A | 7/1998 | Krasner |
| 5,812,087 A | 9/1998 | Krasner |
| 5,825,327 A | 10/1998 | Krasner |
| 5,831,574 A | 11/1998 | Krasner |
| 5,841,396 A | 11/1998 | Krasner |
| 5,874,914 A | 2/1999 | Krasner |
| 5,884,214 A | 3/1999 | Krasner |
| 5,945,944 A | 8/1999 | Krasner |
| 5,999,124 A | 12/1999 | Sheynblat |
| 6,002,363 A | 12/1999 | Krasner |
| 6,016,119 A | 1/2000 | Krasner |
| 6,052,081 A | 4/2000 | Krasner |
| 6,061,018 A | 5/2000 | Sheynblat |
| 6,064,336 A | 5/2000 | Krasner |
| 6,104,338 A | 8/2000 | Krasner |

(Continued)

OTHER PUBLICATIONS

Marketing Material: Qualcomm CDMA Technologies—Integrated Solutions MGP6200 Multimode GPS Processor (8 pages), Jun. 27, 2002.

(Continued)

*Primary Examiner* — Lam T Mai
(74) *Attorney, Agent, or Firm* — RatnerPrestia

(57) ABSTRACT

A Radio Frequency Receiver on a Single Integrated Circuit ("RFSIC") is described. The RFSIC may include a mixer, a phase-locked loop ("PLL") in signal communication with the mixer, and an on-chip auto-tuned RF filter in signal communication with both the mixer and PPL, such that the same PLL simultaneously tunes the frequency of the VCO and the frequency response of the auto-tuned RF filter.

20 Claims, 11 Drawing Sheets

U.S. PATENT DOCUMENTS

| | | | |
|---|---|---|---|
| 6,104,340 | A | 8/2000 | Krasner |
| 6,107,960 | A | 8/2000 | Krasner |
| 6,111,540 | A | 8/2000 | Krasner |
| 6,131,067 | A | 10/2000 | Girerd |
| 6,133,871 | A | 10/2000 | Krasner |
| 6,133,873 | A | 10/2000 | Krasner |
| 6,133,874 | A | 10/2000 | Krasner |
| 6,150,980 | A | 11/2000 | Krasner |
| 6,185,427 | B1 | 2/2001 | Krasner |
| 6,208,290 | B1 | 3/2001 | Krasner |
| 6,208,291 | B1 | 3/2001 | Krasner |
| 6,211,745 | B1 * | 4/2001 | Mucke et al. ............. 331/117 R |
| 6,215,441 | B1 | 4/2001 | Moeglein |
| 6,215,442 | B1 | 4/2001 | Sheynblat |
| 6,236,354 | B1 | 5/2001 | Krasner |
| 6,239,742 | B1 | 5/2001 | Krasner |
| 6,259,399 | B1 | 7/2001 | Krasner |
| 6,272,430 | B1 | 8/2001 | Krasner |
| 6,289,041 | B1 | 9/2001 | Krasner |
| 6,307,504 | B1 | 10/2001 | Sheynblat |
| 6,313,786 | B1 | 11/2001 | Sheynblat |
| 6,314,308 | B1 | 11/2001 | Sheynblat |
| 6,323,736 | B2 * | 11/2001 | Jansson ........................ 331/44 |
| 6,377,209 | B1 | 4/2002 | Krasner |
| 6,408,196 | B2 | 6/2002 | Sheynblat |
| 6,411,254 | B1 | 6/2002 | Moeglein |
| 6,411,892 | B1 | 6/2002 | vanDiggelen |
| 6,417,801 | B1 | 7/2002 | vanDiggelen |
| 6,421,002 | B2 | 7/2002 | Krasner |
| 6,429,814 | B1 | 8/2002 | vanDiggelen |
| 6,433,731 | B1 | 8/2002 | Sheynblat |
| 6,453,237 | B1 | 9/2002 | Fuchs |
| 6,484,097 | B2 | 11/2002 | Fuchs |
| 6,487,499 | B1 | 11/2002 | Fuchs |
| 6,510,387 | B2 | 1/2003 | Fuchs |
| 6,542,821 | B2 | 4/2003 | Krasner |
| 6,583,757 | B2 | 6/2003 | Krasner |
| 6,597,311 | B2 | 7/2003 | Sheynblat |
| 7,031,668 | B2 * | 4/2006 | Darabi et al. .................. 455/75 |
| 7,034,812 | B2 | 4/2006 | Chen |
| 7,268,630 | B2 | 9/2007 | Rhee |
| 8,073,414 | B2 * | 12/2011 | Dubash et al. ............. 455/180.3 |

OTHER PUBLICATIONS

Marketing Material: uNav Microelectronics, uN9×18 Low Power, High Performance GPS Receiver Chipset/uN9×18 GPS Receiver Solution (9pages), uNav Electronics, Jul. 21, 2006.

Marketing Material: uNav Microelectronics, uN9×18 Low Power, High Performance GPS Receiver Chipset (2 pages), uNav Electronics, Jul. 21, 2006.

Marketing Material: Global Locate—Hammerhead II, Single Chip AGPS Solution (2 pages), 2007.

Marketing Mateiral/Press Release: Broadcom Introduces Advanced Single-Chip GPS Solution for Mobile Applications (3 pages), Oct. 5, 2007.

Marketing Material/White Paper: SnapTrack: A Qualcomm Company—Snap track's Wireless Assisted GPS (A-GPS) Solution PRovides the Industry's Best Location System—Location Technologies for GSM, GPRS and WCDMA Networks (Qualcomm CDMA Technologies: Enabling the Future of Communications) (4 pages), 2003.

* cited by examiner

AUTO-TUNING SYSTEM FOR AN ON-CHIP RF FILTER

CROSS-REFERENCE TO RELATED APPLICATIONS

This application is a Divisional Application of application Ser. No. 12/341,551, titled "Auto-tuning System for On-Chip RF Filter," filed Dec. 22, 2008, which claims priority under 35 U.S.C. §119(e) to U.S. Provisional Application Ser. No. 61/076,598, titled "Auto-tuning System For Onchip RF Filter," filed on Jun. 27, 2008, both of which are incorporated into this application by reference in their entirety.

BACKGROUND OF THE INVENTION

1. Field of Invention

This invention relates in general to satellite navigation systems and in particular to Global Positioning System ("GPS") receivers utilizing Radio Frequency ("RF") receivers integrated onto a single integrated circuit ("IC").

2. Related Art

The use of telecommunication devices in present day society has grown at an enormous rate. At present, the demand for portable telecommunication devices such as cellular telephones, Wi-Fi® and Bluetooth® enabled portable devices, Personal Communication Service ("PCS") devices, Global Positioning System ("GPS") enabled portable devices, etc., is growing in popularity every day. As the demand increases for portable telecommunication devices with varying communication characteristics, manufacturers are seeing a need to combine and integrate many of these devices. As an example, there is a need to integrate cellular telephones (i.e., "cellphones") with GPS receivers in order to allow a cellphone to determine its position for both personal and emergency use.

As the need to combine multiple telecommunications devices grows and also as the need to integrate them into a minimum number of integrated circuits ("ICs" also known as "chips") increases, there is a need to eliminate any unnecessary circuitry to reduce the area size of the circuitry and the associated costs. A known technique for reducing costs and area size in telecommunication device receivers is to integrate the receivers on to a single IC creating what is commonly known as a Radio Frequency Integrated Circuit ("RFIC") receiver.

Unfortunately, most existing RFIC receivers are not capable of being fully integrated because they use external RF filters that utilize Surface Acoustic Wave ("SAW"), Bulk Acoustic Wave ("BAW"), or ceramic technology. The reason for this is that these external RF filters are typically discrete components and the Q-factor that can be achieved in SAW, BAW, and ceramic technology is higher than can be achieved in silicon leading to better performance within the RFIC receiver circuitry.

As an example, in FIG. 1 a block diagram of an example of a known implementation of an RFIC receiver 100 is shown. In this example, the RFIC receiver 100 may be in signal communication with an external RF filter 102 and may include a low-noise amplifier ("LNA") 104, optional RF amplifier 106, mixer 108, a frequency reference 109, and a phase-locked loop ("PLL") 110. As an example, the RF filter 102 may be in signal communication with both the LNA 104 and optional RF amplifier 106 via signal paths 112 and 114, respectively. The mixer 108 may be in signal communication with both optional RF amplifier 106 and PLL 110 via signal paths 116 and 118, respectively.

The PLL 110 may include a phase detector 120, loop filter 122, divide-by-N divider 124, and a voltage-controlled oscillator ("VCO") 126. The phase detector 120 may be in signal communication with both loop filter 122, divide-by-N divider 124, and frequency reference 109 via signal paths 128, 130, and 131, respectively. The VCO 126 may also be in signal communication with the mixer 108, the loop filter 122 and divide-by-N divider 124 via signal paths 118, 132 and 134, respectively, where signal paths 118 and 134 may be the same signal path. It is appreciated by those skilled in the art that in general, a PLL (such as PLL 110) is a circuit architecture that acts as a closed-loop frequency control system, which functions based on phase-sensitive detection of any phase difference between a reference input 135 and the divided output 136 of the controlled oscillator (such as VCO 126).

In an example of operation, the RTIC receiver 100 receives an input RF signal 137 at the LNA 104. The LNA 104 amplifies the input RF signal 137 to create an amplified signal 138 and passes the amplified signal 138 to the external RF filter 102. The external RF filter 102 filters the amplified signal 138 to create a filtered signal 140 and passes the filtered signal 140 to the optional RF amplifier 106. The optional RF amplifier 106 amplifies the filtered signal 140 to create a second amplified signal 142 and passes the second amplified signal 142 to the mixer 108. The mixer 108 then mixes the second amplified signal 142 with a local oscillator ("LO") signal 144 (which was produced by the PLL 110) and produces a resultant signal 146. Within this process, the PLL 110 utilizes a frequency reference signal 135 to "lock" the VCO 126 to a multiple frequency of the frequency reference signal 135.

Generally, in multiple RF transceiver applications (such as cellphone applications) with large interferers, the GPS receiver may require that two SAW filters are used; one before the LNA (generally known as a pre-filter) and one between the LNA and the mixer. As cellphones and other portable telecommunication devices become smaller and less costly, there is increasing pressure to eliminate one or more of these SAW filters to save area and cost. Typically, other receivers often have similar problems and similar solutions.

Additionally, while an integrated (i.e., "on-chip") RF filter may not perform as well as an external SAW filter, they now have the potential of performing well enough to eliminate one SAW filter in applications that currently require two SAW filters because of the improvement of performance of on-chip spiral inductors, thus reducing the total system implementation size and cost.

However, due to Process-Voltage-Temperature ("PVT") variations, on-chip RF filters must be tuned or calibrated to maintain their frequency response. Unfortunately, tuning circuits consume power and area on-chip, and they also increase the complexity and risk of failure of the on-chip RF filter.

Therefore, there is a need for a system and method capable of auto-tuning and/or auto-calibrating an on-chip RF filter without requiring any additional tuning circuitry, other than what is already present in the PLL synthesizer of the RF receiver.

SUMMARY

A Radio Frequency Receiver on a Single Integrated Circuit ("RFSIC") is described. The RFSIC may include a mixer, a phase-locked loop ("PLL"), and an auto-tuned RF filter where the PLL is in signal communication with the mixer and the auto-tuned RF filter is in signal communication with both the mixer and PLL. The PLL is configured to receive a PLL frequency reference input signal ("PFRI signal") that has a PLL frequency reference input signal frequency ("PFRI frequency") and, in response, the PLL is configured to lock to the PFRI signal and produce a tuning signal. The auto-tuned RF filter is configured to have a frequency response and may be configured to receive the tuning signal from the PLL, and, in response, adjust the frequency response of the auto-tuned RF filter to the tuning signal. The RFSIC is configured such that the mixer, PLL, and auto-tuned RF filter are integrated onto a signal integrated circuit ("IC").

As an example of operation, the RFSIC may perform a method for auto-tuning the frequency response of the auto-tuned RF filter that includes receiving a tuning signal from the PLL and auto-tuning the frequency response of the auto-timed RF filter with the tuning signal.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of examples of implementations, reference is made to the accompanying drawings that form a part hereof, and which show, by way of illustration, specific implementations of the invention that may be utilized. Other implementations may be utilized and structural changes may be made without departing from the scope of the present invention.

A Radio Frequency Receiver on a Single Integrated Circuit ("RFSIC") is described. The RFSIC may include a mixer, a phase-locked loop ("PLL") in signal communication with the mixer, a PLL frequency reference in signal communication with the PLL, and an auto-tuned on-chip RF filter (generally referred to herein as an "auto-tuned RF filter") in signal communication with both the mixer and PLL. The PLL may include a Voltage-controlled Oscillator ("VCO"), phase detector, loop filter, and divider. In operation, the RFSIC utilizes a method for auto-tuning and/or calibrating the auto-tuned RF filter using a tuning signal derived from the PLL where the frequency response of the auto-tuned RF filter is configured to be automatically tuned and/or calibrated by the tuning signal. The tuning signal may be a VCO input signal and/or a calibration signal related to a PLL frequency reference input signal ("PFRI signal"), wherein the auto-tuning and/or calibration tracks the tuning signal that drives a VCO frequency of the VCO. Again, it is appreciated by those skilled in the art that in general, a PLL is a circuit architecture that acts as a closed-loop frequency control system, which functions based on phase-sensitive detection of any phase difference between output signals of the VCO and a known frequency reference such as, for example, a PLL frequency reference input signal frequency ("PFRI frequency") of the PFRI signal.

As an example of operation, the RFSIC receives the tuning signal (or tuning signals) from the PLL and, in response, auto-tunes and/or calibrates the frequency response of the auto-tuned RF filter in order to tune out Process-Voltage-Temperature ("PVT") variations. In this example, the same reactive devices in the PLL that are utilized for tuning the VCO frequency of the VCO are also utilized for tuning the auto-tuned RF filter and, as a result, the PVT variations of the reactive devices in both the VCO and auto-tuned RF filter will then be tracked and tuned out by the PLL.

This enables the RFSIC to lock the frequency response of the auto-tuned RF filter to a fixed external reference frequency (such as the PLL frequency reference), which is input into the PLL, without implementing any additional auto-tune and/or auto-calibration circuitry. The method saves power, IC chip area and complexity.

Figure 1:
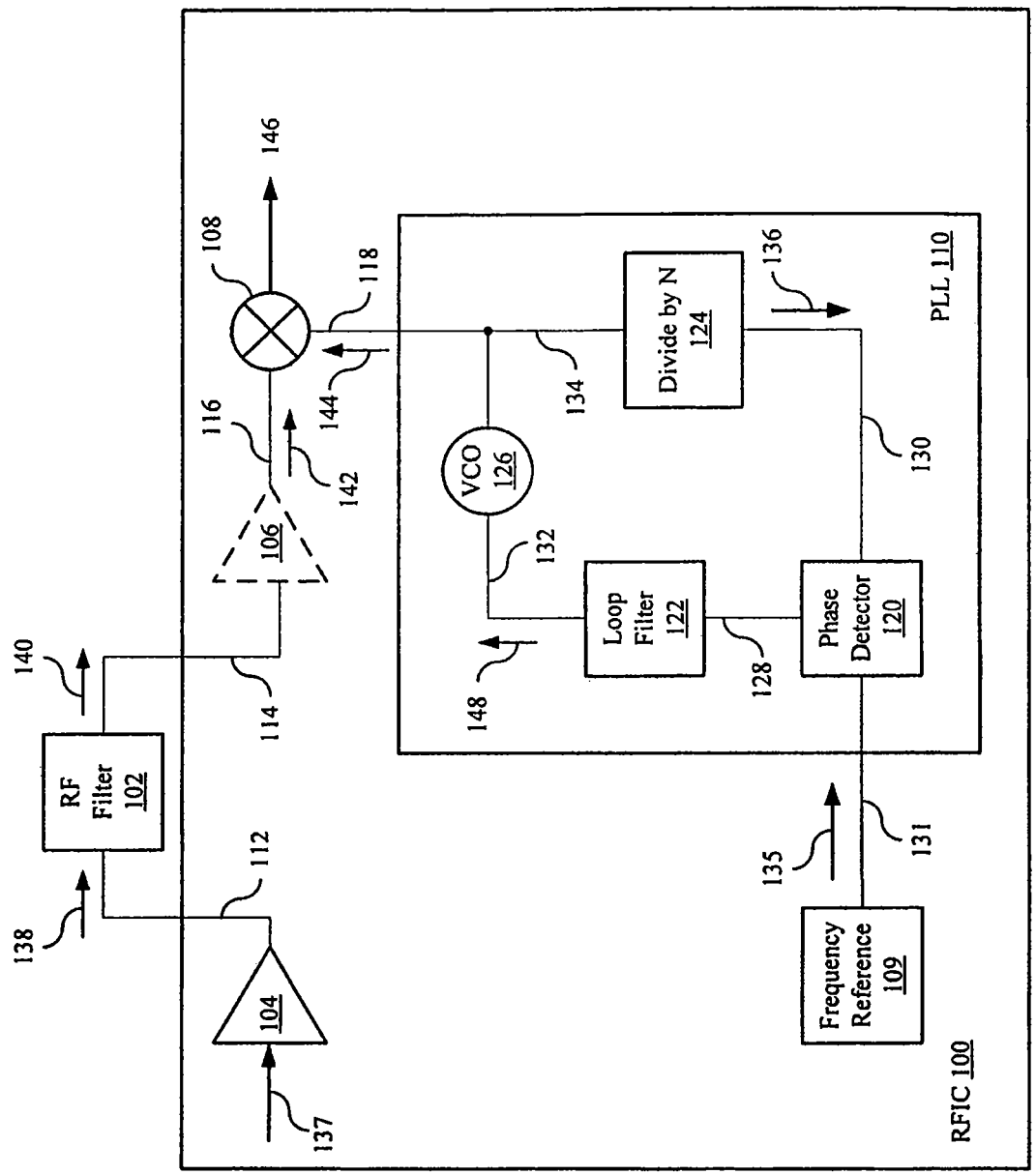
FIG. 1 is a block diagram of an example of a known implementation of a Radio Frequency Integrated Circuit ("RFIC") receiver.
Figure 2:
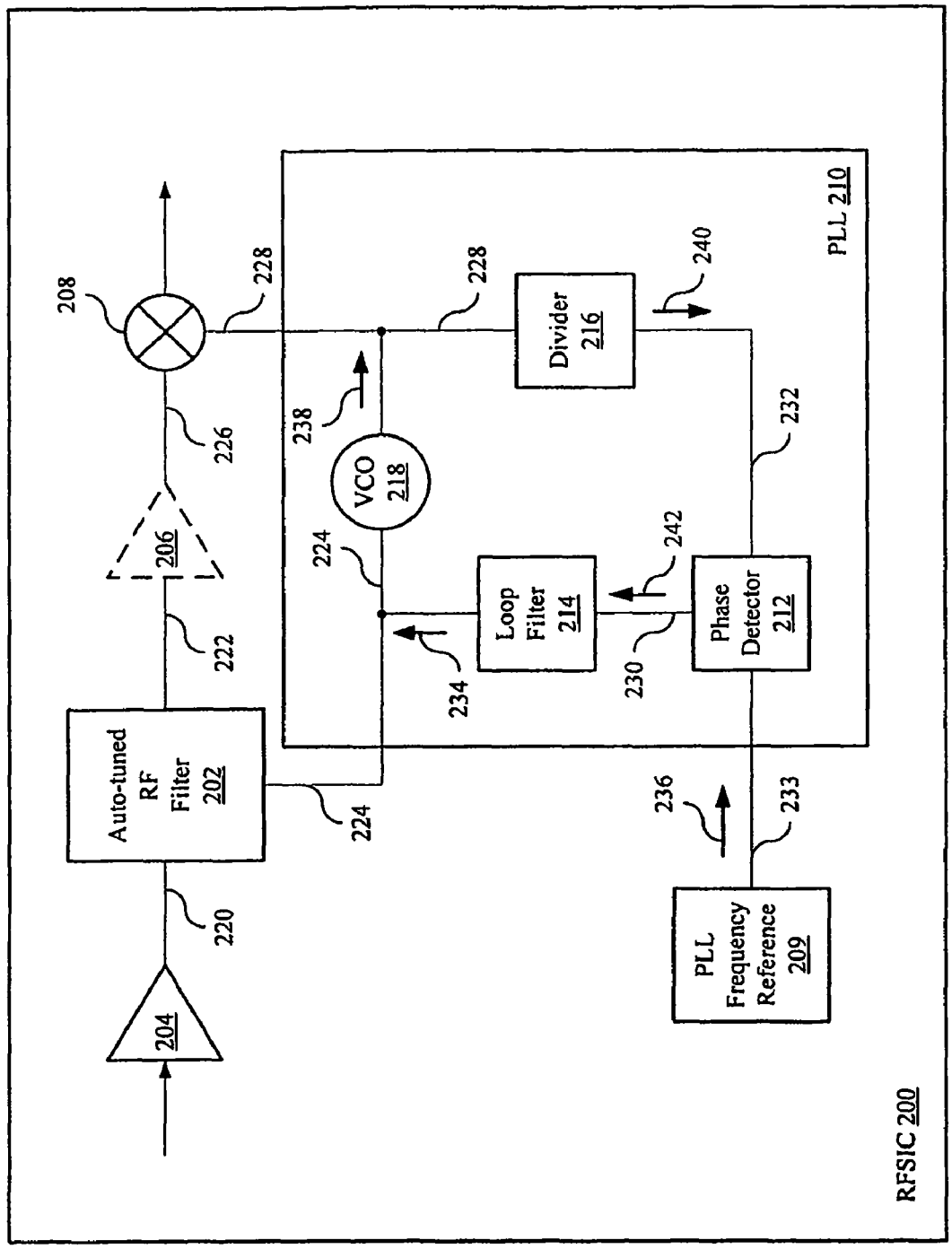
FIG. 2 is a block diagram of an example of an implementation of a Radio Frequency Receiver on a Single Integrated Circuit ("RFSIC") utilizing an "on-chip" auto-tuned RF filter with a new tuning method in accordance with the invention.

Turning to FIG. 2, a block diagram of an example of an implementation of an RFSIC 200 utilizing an "on-chip" auto-tuned RF filter 202 (herein known as an "auto-tuned RF filter") is shown. In this example, the RFSIC 200 may include the auto-tuned RF filter 202, low-noise amplifier ("LNA") 204, optional RF amplifier 206, mixer 208, PLL frequency reference 209, and a PLL 210. The PLL 210 may include a phase detector 212, loop filter 214, frequency divider 216, and VCO 218.

In this example, the auto-tuned RF filter 202 may be in signal communication with the LNA 204, optional RF amplifier 206 and PLL module 210 via signal paths 220, 222, and 224, respectively. The mixer 208 may be in signal communication with both optional RF amplifier 206 and PLL 210 via signal paths 226 and 228, respectively. Additionally, in the PLL 210, the VCO 218 may be in signal communication with both the loop filter 214 and frequency divider 216 via signal paths 224 and 228, respectively. The phase detector 212 may be in signal communication with both the loop filter 214, frequency divider 216, and PLL frequency reference 209 via signal paths 230, 232, and 233, respectively.

It is appreciated by those skilled in the art that the circuits, components, modules, and/or devices of the RFSIC 200 are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device, The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

The auto-tuned RF filter 202 may be a circuit designed to pass in-band signals and reject out-of-band interference. The design of the auto-tuned RF filter 202 may be band-pass, low-pass, high-pass or band-reject, depending on the requirements of the RFSIC 200 and the frequencies of likely interferers. The order of the auto-tuned RF filter 202 may also depend on the RFSIC 200 requirements. As an example, the auto-tuned RF filter 202 may include the same reactive devices that are used in the VCO 218 circuit. In general, it is appreciated by those skilled in the art that spiral inductors and variable capacitors are the most commonly used reactive devices in an RF VCO to form an LC tank circuit, so these devices may also be used to build the auto-tuned RF filter 202. The frequency response of both the VCO 218 and auto-tuned RF filter 202 is tuned by tuning the variable capacitors via a tuning signal 234. As examples, the variable capacitors may be switched-capacitors (variable capacitors based on capacitor arrays digitally controlled by switches) or varactors (voltage-controlled diode capacitors). The varactors may be MOS-varactors or Junction-varactors. Spiral inductors, switched capacitors and varactors are available in bipolar, BiCMOS and CMOS process technologies. The RF amplifier 206 is optional and could be integrated with the mixer 208. The optional RF amplifier 206 provides additional RF gain between the auto-tuned RF filter 202 and the mixer 208 that may be necessary, depending on the noise, gain and compression requirements of the RFSIC 200.

The PLL 210 may be a typical PLL circuit/device that permits an external reference signal such as PFRI signal 236 (from PLL frequency reference 209) to control the frequency and phase of a local oscillator ("LO") signal 238 generated by the VCO 218. As such, the PLL 210 produces the tuning signal 234 and LO signal 238 that are locked to the PFRI signal 236.

The frequency of the VCO 218 may be a multiple of the frequency of the PFRI signal 236. Because the PLL 210 includes the frequency divider 216, the PLL 210 may function as a frequency synthesizer (also known as a PLL synthesizer). As an example, if the PFRI signal 236 is produced by a crystal oscillator (not shown) at a certain PFRI frequency, the VCO 218 within the PLL 210 will produce an LO signal 238 at a different frequency than the PRFI signal 236. However, the LO signal 238 generated by the VCO 218 will be "phase-locked" to the PFRI signal 236 and thus the LO signal 238 quality will be related to the PFRI signal 236 produced by the crystal oscillator.

In this example, the circuit and/or components of the PLL 210 may be standard type circuits, components, or devices. For example, the phase detector 212 may be a circuit, device, or component that is capable of detecting a frequency and/or phase difference between the PFRI signal 236 and a frequency divided signal 240 produced by the frequency divider 216. The phase detector 212 produces a difference signal 242 (which is a phase-error signal, frequency-error signal, or combination of both) proportional to the difference in phases between the PFRI signal 236 and frequency divided signal 240. The loop filter 214 is a circuit, component, or device capable of receiving the difference signal 242, via signal path 230, filtering it, possibly amplifying it, and passing the resulting tuning signal 234 to both the VCO 218 and auto-tuned RF filter 202 via signal path 224.

The frequency divider 216 is a circuit, component, and/or device that produces the frequency divided signal 240 with a lower frequency from an input signal (i.e., the LO signal 238 via signal path 228) with a higher frequency. As an example, if the frequency divider 216 is an integer digital divider (i.e., a divide-by-N type frequency divider where "N" is an integer value representing the modulus—also known as the "division factor" of the frequency divider), the frequency divided signal 240 will have a frequency that is lower than the frequency of the LO signal 238. In this example, the frequency of the frequency divided signal 240 is equal to the frequency of the LO signal 238 divided by the modulus N. Alternatively, the divider may also be a fractional divider, as used in a fractional-N frequency synthesizer; in this case N is not limited to integer values.

The VCO 218 is a variable oscillator circuit that is capable of producing the LO signal 238 with frequency that may deviate in proportion to the value of the voltage signal 234. Generally, the VCO 218 (similar to most VCOs in modern integrated receivers) may include an LC tank circuit (not shown), where inductance "L" is implemented using spiral inductors and the variable capacitance "C" is provided by utilizing RF varactors and/or switched-capacitors. As a result, the VCO 218 may be tuned by tuning the voltage across the varactors shown as tuning signal 234 (which is a voltage signal). It is appreciated by those skilled in the art that additional fixed capacitors may be utilized in addition to the varactors and/or switched-capacitors, to achieve the total capacitance required.

As an example, the auto-tuned RF filter 202 may be implemented as an LC RF filter that utilizes the same type of varactors, switched-capacitors, capacitors and spiral inductors, as are utilized in the VCO 218. In this example, if the varactors and/or switched-capacitors in the auto-tuned RF filter 202 are tuned by the same voltage tuning signal 234 that tunes the VCO 218, the PVT variations of the varactors, switched-capacitors, capacitors and inductors in the auto-tuned RF filter 202 will be tuned out automatically.

Figure 3:
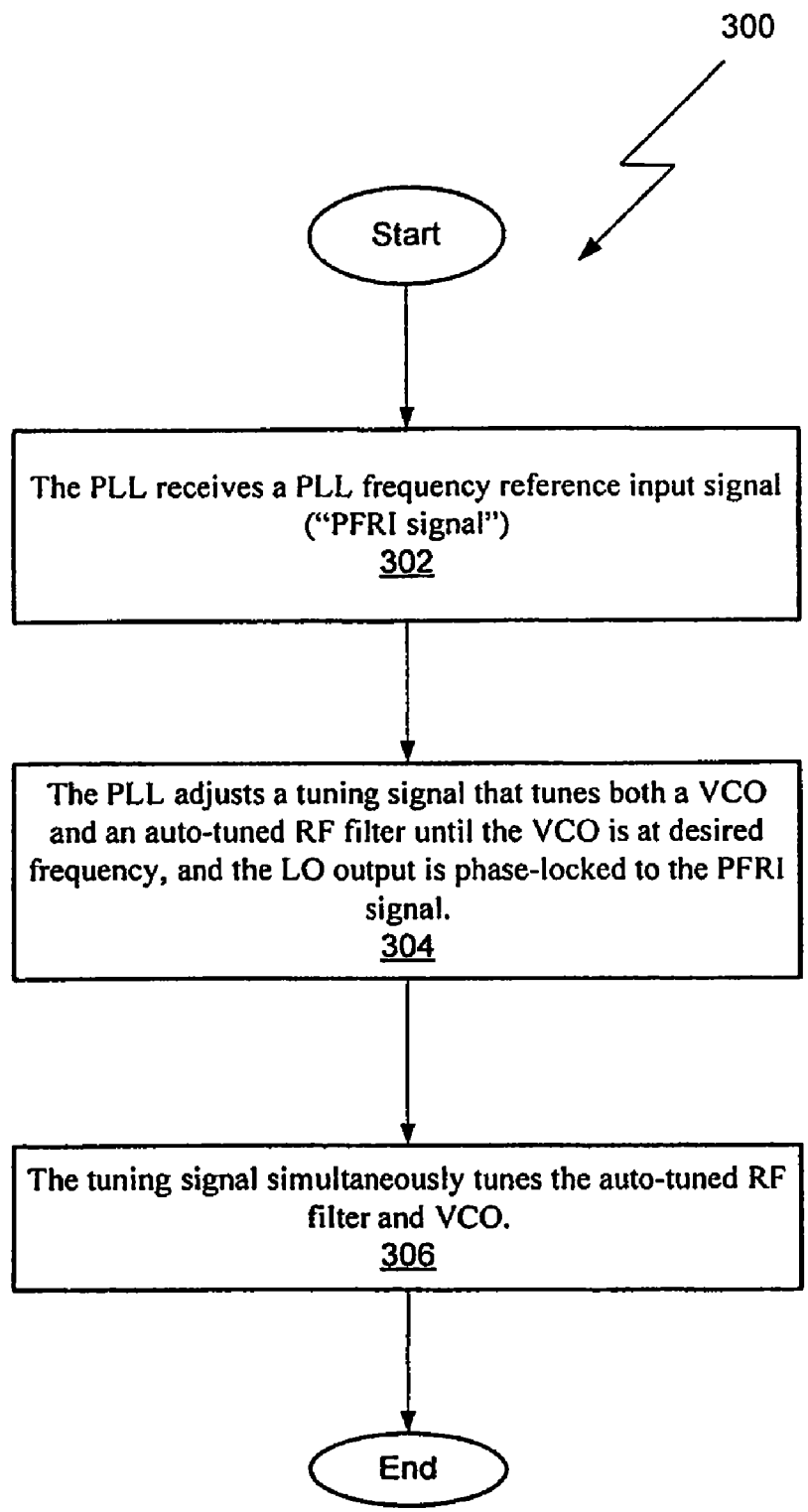
FIG. 3 is a flowchart of an example of an implementation of a method performed by the operation of the RFSIC shown in FIG. 2 in accordance with the invention.

In FIG. 3, a flowchart 300 is shown that illustrates an example method performed by the RFSIC 200 of FIG. 2 in operation. In this example, the method begins in step 302 where the PLL 210 receives the PFRI signal 236. In step 304, the PLL 210 adjusts the tuning signal 234 until the VCO 218 is at a desired frequency, where the LO signal 238 is phase-locked to the PFRI signal 236. In step 306, the tuning signal 234 simultaneously tunes the auto-tuned RF filter 202 and VCO 218. The process then ends.

As such, in general this invention presents a method for auto-tuning an RF filter 202 using the existing tuning signal 234 of the VCO 218 in the RFSIC 200 that includes the integrated PLL 210. As discussed above, the same reactive devices may be used for tuning the frequency of the VCO 218 and auto-tuned RF filter 202. In this example, the PVT variations of reactive devices in both the VCO 218 and auto-tuned RF filter 202 will then be tracked and tuned out by the PLL 210. This approach enables the frequency response of the auto-tuned RF filter 202 to track the PFRI signal 236 without implementing any additional auto-tuning circuitry. As such, the invention saves power, chip area and complexity, compared to other tuning methods for RF filters.

Figure 4:
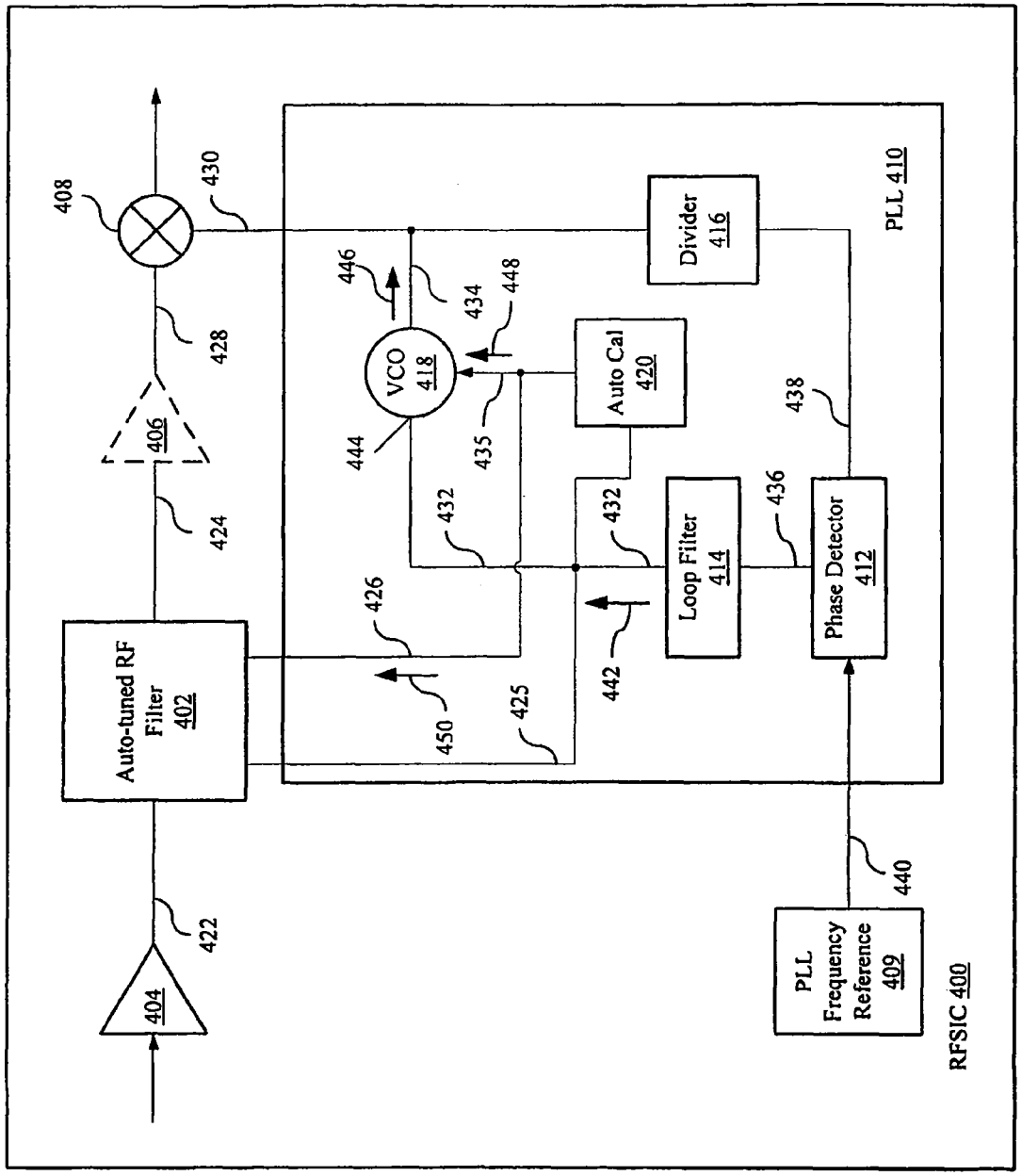
FIG. 4 is a block diagram of an example of another implementation of an RFSIC utilizing an auto-tuned RF filter in accordance with the invention.

In FIG. 4, a block diagram of an example of another implementation of an RFSIC 400 utilizing an auto-tuned RF filter 402 is shown. Similar to the example shown in FIG. 2, the RFSIC 400 may include the auto-tuned RF filter 402, an LNA 404, optional RF amplifier 406, mixer 408, PLL frequency reference 409, and a PLL 410. The PLL 410 may include a phase detector 412, loop filter 414, frequency divider 416, VCO 418, and auto-calibration circuit 420. Unlike the example in FIG. 2, the RFSIC 400 is configured to allow the VCO 418 to be coarse tuned.

In this example, the auto-tuned RF filter 402 may be in signal communication with the LNA 404, optional RF amplifier 406 and PLL module 410 via signal paths 422, 424, and 425 and 426, respectively. The mixer 408 may be in signal communication with both optional RF amplifier 406 and PLL 410 via signal paths 428 and 430, respectively. Additionally, in the PLL 410, the VCO 418 may be in signal communication with the loop filter 414, frequency divider 416, and auto-calibration circuit 420 via signal paths 432, 434, and 435, respectively. The phase detector 412 may be in signal communication with the loop filter 414, frequency divider 416, and PLL frequency reference 409 via signal paths 436, 438, and 440 respectively. In this example, signal path 425 from the PLL 410 to the auto-tuned RF filter 402 is the same as signal path 432 from the loop filter 414.

As an example, this configuration may be implemented by utilizing switched-capacitors (not shown) that are capable of being switched in or out of the LC tank circuit (not shown), using digitally controlled MOS switches (not shown). The purpose of the coarse tuning and/or auto-calibration is to tune out design and process errors and center the VCO's 418 tuning range. As examples, the coarse tuning settings can be determined during characterization and fixed for production, or can be set each time during start-up of the chip using an auto-calibration routine. The coarse tuning capacitors may also be included in the auto-tuned RF filter 402.

As an example of operation, the RFSIC 400 receives a tuning signal (or tuning signals generally referred to as "vtune") 442 from the loop filter 414 of the PLL 410 (via signal paths 425 and 432) and, in response, auto-tunes and/or calibrates the frequency response of the auto-tuned RF filter 402 in order to tune out PVT variations. Vtune 442 is generally a voltage tuning signal that is input into the input 444 of the VCO 418. Vtune 442 is also input in the auto-calibration circuit 420, which utilizes vtune 442 to produce two control words 448 and 450 to drive the VCO 418 and the auto-tuned RF filter 402. These control words 448 and 450 are multi-bit digital signals that are generated by the auto-calibration circuit 420 based on a comparison of vtune 422 to a fixed reference voltage (not shown). In this example, the reference voltage may be a fixed fraction of the RFSIC's supply voltage, generated onchip within the auto-calibration circuit 420. The control word 448 changes the VCO frequency by switching in more or less capacitors in the VCO tank circuit, which is internal to the VCO 418, depending whether vtune 442 is higher or lower in value to the reference voltage; this process continues iteratively until the difference between vtune 442 and the reference voltage is minimized.

In this example, the auto-calibration circuit 420 may produce the control word 450 that is sent to the auto-tuned RF filter 402 via signal path 426. The auto-calibration circuit 420 may also produce the other control word 448 that is sent to VCO 418 via signal path 435. The auto-tuned RF filter's 402 coarse tuning capacitors would then receive the control word 450 that is equal to (or related to) the VCO's 418 control word 448. If the control words 448 are 450 are related but not equal, they would be related by a variable offset, so that any offsets between the VCO 418 and auto-tuned RF filter 402 can be tuned out during characterization and tracked during auto-calibration if used. Typically, there would be an offset between control words 448 and 450 if there was a design or modeling error that caused an optimal auto-tuned RF filter 402 response to occur at a different value of the control word 450 from the optimal VCO 418 response.

In general, this implementation example allows the same PLL 410 circuitry that tunes the VCO 418 to tune the auto-tuned RF filter 402 without using any additional circuitry or die space. The implementation allows the RFSIC 400 to utilize three methods for tuning the auto-tuned RF filter 402 that may be used depending on the circuit design and tuning accuracy requirement.

The first method is to not utilize the auto-calibration circuit 420 and tune the auto-tuned RF filter 402 utilizing only the vtune signal 442 via signal path 425 (same as signal path 432). If this method is chosen, the RFSIC 400 would operate the same as the example described in FIG. 2 related to RFSIC 200. This method may be utilized when a high tuning accuracy and/or continuous tuning are (is) desired and the auto-tuned RF filter 402 has enough tuning range to accommodate all PVT variation without coarse calibration.

The second method is to not utilize vtune 442 and tune the auto-tuned RF filter. 402 utilizing only the auto-calibration circuit 420. If this method is chosen, the auto-tuned RF filter 402 would only receive control word 450 from the auto-calibration circuit 420. This method may be used if the coarse tuning accuracy to be achieved by auto-calibration circuit 420 alone is sufficient for the desired application. In this case the auto-tuned RF filter 402 would not be tuned continuously, but only when the auto-calibration circuit 420 circuit is run, which may typically happen upon start-up condition or when triggered by another predetermined event.

The third method uses both the fine tuning and coarse tuning offered by the first and second methods respectively, as described above, to maximize the manufacturability and performance of the RFSIC.

Figure 5:
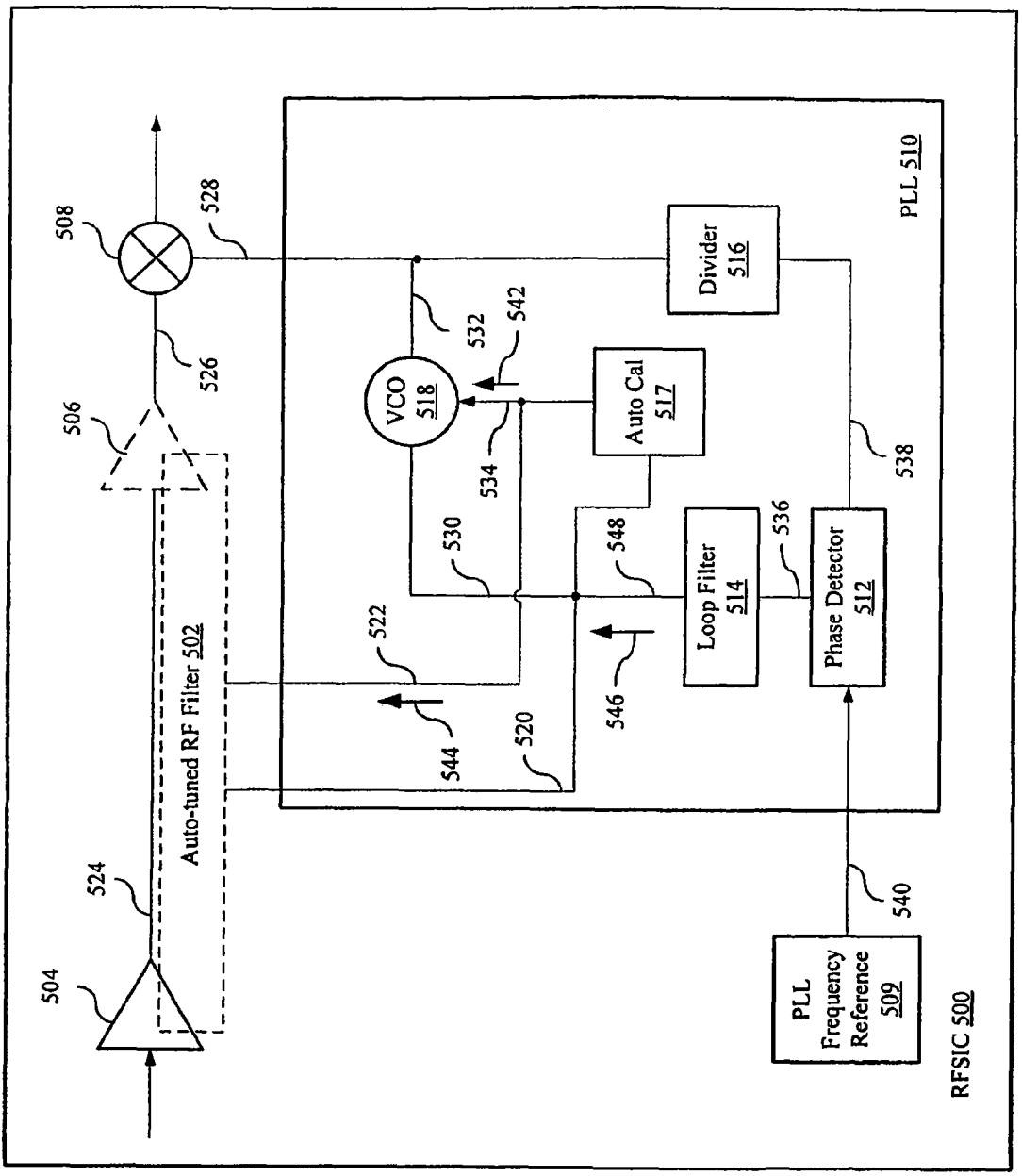
FIG. 5 is a block diagram of an example of another implementation of an RFSIC utilizing an auto-tuned RF filter in accordance with the invention.
Figure 6:
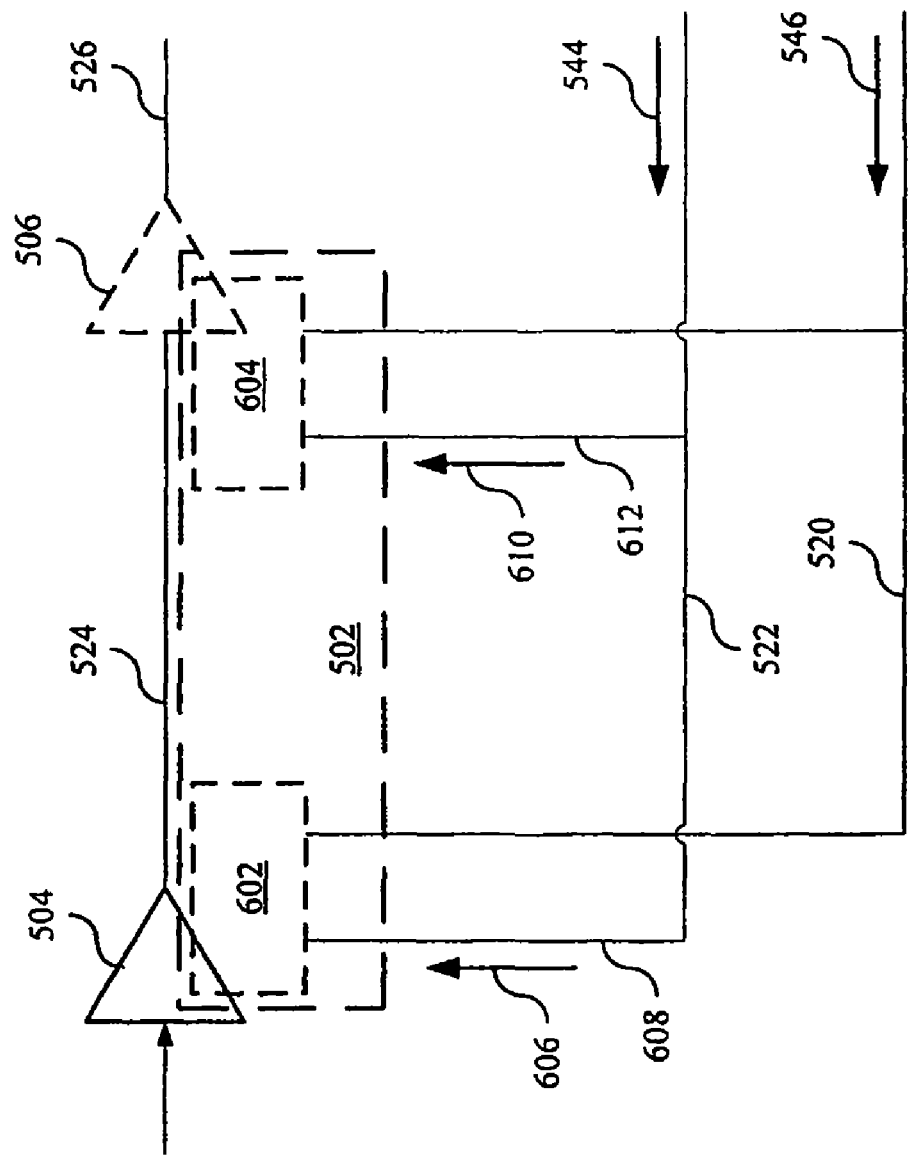
FIG. 6 is a block diagram of the auto-tuned RF filter shown in FIG. 5 where the configuration of the auto-tuned RF filter includes two separate auto-tuned RF filters in accordance with the invention.
Figure 7:
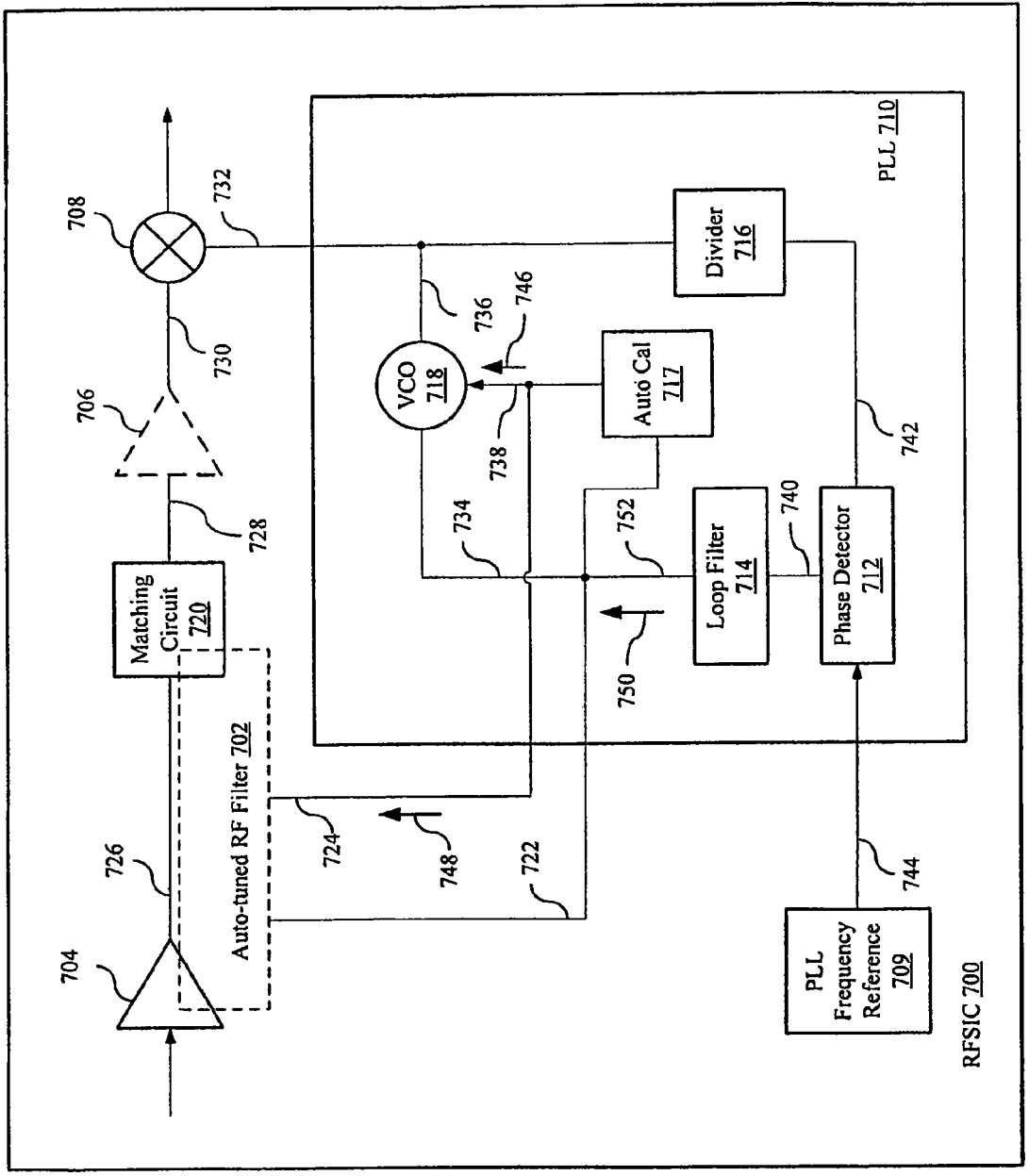
FIG. 7 is a block diagram of an example of another implementation of an RFSIC utilizing an auto-tuned RF filter in accordance with the invention.

Turning to FIGS. 5, 6, and 7, these figures show block diagrams of other example implementations of the RFSICs utilizing on-chip auto-tuned RF filters, where the auto-tuned RF filters are integrated into the LNA and/or RF amplifier circuits, using the spiral inductors that already exists in these circuits.

In FIG. 5, a block diagram of an example of another implementation of an RFSIC 500 utilizing an auto-tuned RF filter 502 is shown. Similar to the example shown in FIG. 4, the RFSIC 500 may include the auto-tuned RF filter 502, an LNA 504, optional RF amplifier 506, mixer 508, PLL frequency reference 509, and a PLL 510. The PLL 510 may include a phase detector 512, loop filter 514, frequency divider 516, auto-calibration circuit 517, and VCO 518.

In this example, the RFSIC 500 integrates the auto-tuned RF filter 502 into both the LNA 504 and optional RF amplifier 506 because, generally, an onchip LC filter utilizes a spiral inductor (or inductors) that consume most of the filter area, which generally translates into additional silicon cost. Since many LNA and RF amplifier designs use spiral inductors as a load, the auto-tuned RF filter may utilize these spiral inductors resulting in more efficient use of the area of the IC and reduced cost.

As such, the auto-tuned RF filter 502 may be integrated into LNA 504 and optional RF amplifier 506 and in signal communication with the PLL module 510 via signal paths 520 and 522. The LNA 504 and optional RF amplifier 506 may be in signal communication via signal path 524 and the mixer 508 may be in signal communication with both optional RF amplifier 506 and PLL 510 via signal paths 526 and 528, respectively. Additionally, in the PLL 510, the VCO 518 may be in signal communication with both the loop filter 514, frequency divider 516, and auto-calibration circuit 517 via signal paths 530, 532 and 534, respectively. The phase detector 512 may be in signal communication with the loop filter 514, frequency divider 516, and PLL frequency reference 509 via signal paths 536, 538, and 540 respectively. Similar to FIG. 4 in this implementation example, the auto-calibration circuit 517 produces two control words: a first control word 542 is sent to the VCO 518 and a second control word 544 is sent to the auto-tuned RF filter 502. Also similar to FIGS. 2 and 4, the loop filter 514 produces a voltage tuned signal vtune 546 via signal path 548.

The auto-tuned RF filter 502 may be tuned using the same methods described above in FIG. 4 and is capable of performing the same three methods described in FIG. 4 with respect to utilizing vtune 546 and/or control word 544.

In the example of FIG. 5, the auto-tuned RF filter 502 is shown integrated into the LNA 504 and optional RF amplifier 506. In FIG. 6, a block diagram of the auto-tuned RF filter 502 is shown where the configuration of the auto-tuned RF filter 502 includes two separate auto-tuned RF filters 602 and 604. In this example, the first auto-tuned RF filter 602 is shown integrated into the LNA 504 and the second auto-tuned RF filter 604 is shown integrated into the optional RF amplifier 506.

In an example of operation, the first auto-tuned RF filter 602 may receive a first control word 606 via signal path 608 and the second auto-tuned RE filter 604 may receive a second control word 610 via signal path 612. The first control word 606 and the second control word 610 may be equal or related based on whether any offsets between the LNA 504 and optional RF amplifier 506 can be tuned out during characterization and tracked during auto-calibration if used. If the first control word 606 and the second control word 610 are equal then they are equal to control word 544 via signal path 522 as described in FIG. 5.

Additionally, the first auto-tuned RF filter 602 and the second auto-tuned RF filter 604 may receive vtune 546 via signal path 520. As discussed above in the description of FIG. 5, vtune 546 and second control word 544 may be used based on the desired method of operation of the RSFIC 500. Moreover, in this example, both auto-tuned RF filters 602 and 604 may be used or only one may be used. If only one is used, it may be either auto-tuned RF filter 602 or auto-tuned RF filter 604.

Similar to FIG. 5, in FIG. 7, a block diagram of an example of another implementation of an RFSIC 700 utilizing an auto-tuned RF filter 702 is shown. Similar to the example shown in FIG. 5, the RFSIC 700 may include the auto-tuned RF filter 702, an LNA 704, optional RF amplifier 706, mixer 708, PLL frequency reference 709, and a PLL 710. The PLL 710 may include a phase detector 712, loop filter 714, frequency divider 716, auto-calibration circuit 717, and VCO 718.

The auto-tuned RF filter 702 may be integrated into LNA 704 and matching circuit 720 and in signal communication with the PLL module 710 via signal paths 722 and 724. The LNA 704 and matching circuit 720 may be in signal communication via signal path 726. The matching circuit 720 may be in signal communication with the optional RF amplifier 706 via signal path 728 and the mixer 708 may be in signal communication with both optional RF amplifier 706 and PLL 710 via signal paths 730 and 732, respectively. Additionally, in the PLL 710, the VCO 718 may be in signal communication with the loop filter 714, frequency divider 716, and auto-calibration circuit 717 via signal paths 734, 736 and 738, respectively. The phase detector 712 may be in signal communication with the loop filter 714, frequency divider 716, and PLL frequency reference 709 via signal paths 740, 742, and 744 respectively. Similar to FIGS. 4 and 5, in this implementation example the auto-calibration circuit 717 produces two control words: a first control word 746 is sent to the VCO 718 and a second control word 748 is sent to the auto-tuned RF filter 702. Also similar to FIGS. 2, 4, 5 and 6, the loop filter 714 produces a voltage tuned signal vtune 750 via signal path 752.

It is appreciated by those skilled in the art that similar to FIG. 6, the auto-tuned RF filter 702 may be split into two auto-tuned RF filters (not shown) where the first auto-tuned RF filter (not shown) is integrated into the LNA 704 and the second auto-tuned RF filter (not shown) is integrated into the input matching circuitry 720 of the optional RF amplifier 706. If only one auto-tuned filter is used it may be either the auto-tuned RF filter integrated into the LNA 704 or the auto-tuned RF filter integrated in the matching circuit 720.

Additionally, the first auto-tuned RF filter (not shown) and the second auto-tuned. RF filter (not shown) may receive vtune 750 via signal path 752. As discussed above in the description of FIGS. 5 and 6, vtune 750 and/or the control word 748 may be used based on the desired method of operation of the RSFIC 700.

Figure 8:
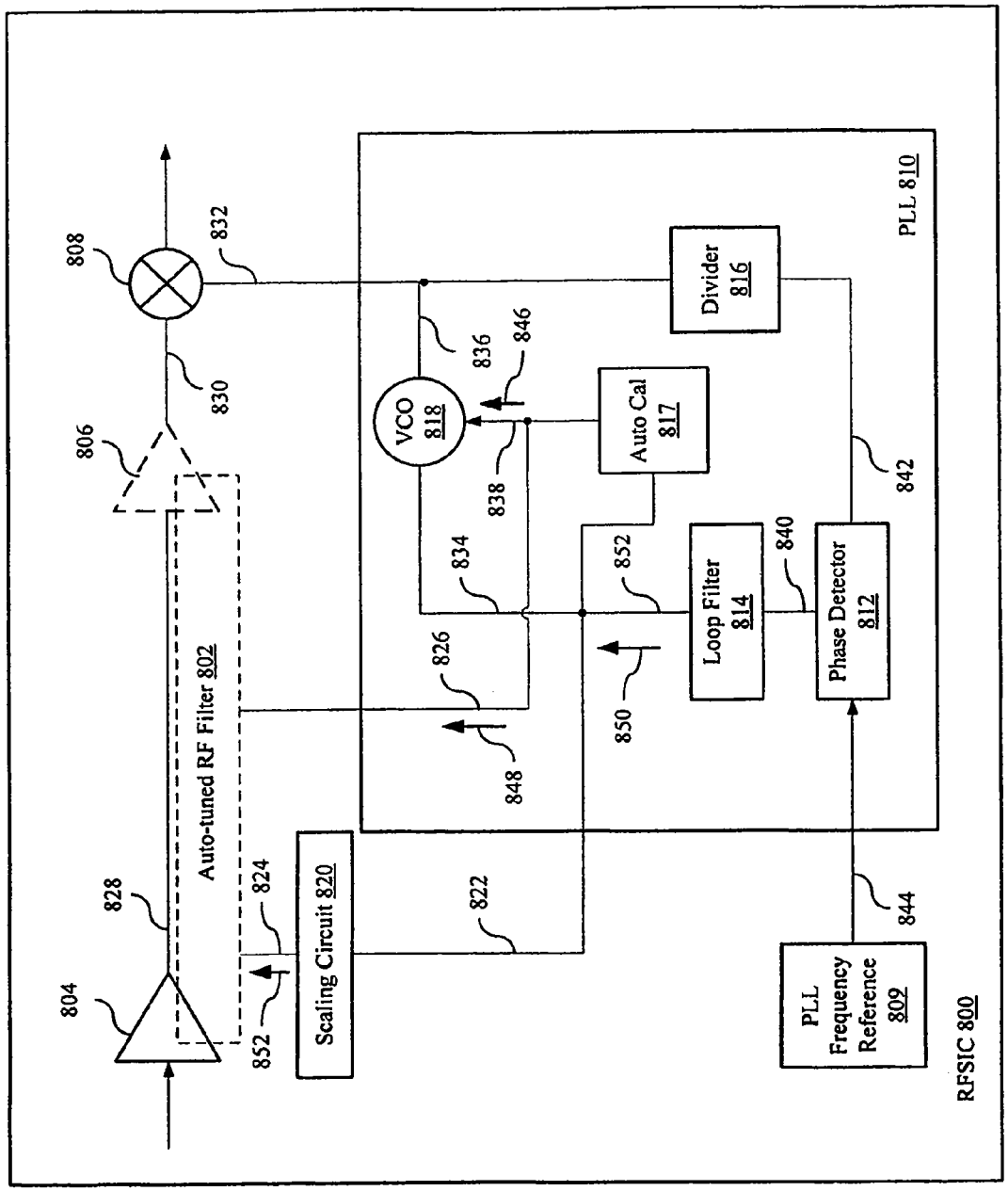
FIG. 8 is a block diagram of an example of another implementation of an RFSIC utilizing an auto-tuned RF filter and scaling circuit in accordance with the invention.

Similar to FIG. 5, in FIG. 8, a block diagram of an example of another implementation of an RFSIC 800 utilizing an auto-tuned RF filter 802 is shown. Similar to the example shown in FIG. 5, the RFSIC 800 may include the auto-tuned RF filter 802, an LNA 804, optional RF amplifier 806, mixer 808, PLL frequency reference 809, and PLL 810. The PLL 810 may include a phase detector 812, loop filter 814, frequency divider 816, auto-calibration circuitry 817 and VCO 818. Unlike the example in FIG. 5, the RFSIC 800 is configured to allow for greater frequency accuracy and better tracking than provided by a coarse tuning offset in case the auto-tuned RF filter 802 does not have similar tuning slope to the VCO 818. In order to achieve this greater frequency accuracy and better tracking, the RFSIC 800 utilizes a scaling circuit 820.

The auto-tuned RF filter 802 may be integrated into LNA 804 and optional RF amplifier 806 and in signal communication with the PLL module 810 via signal paths 822 and 824 (through the scaling circuit 820) and 826. The LNA 804 and optional RF amplifier 806 may be in signal communication via signal path 828 and the mixer 808 may be in signal communication with both optional RF amplifier 806 and PLL 810 via signal paths 830 and 832, respectively. Additionally, in the PLL 810, the VCO 818 may be in signal communication with the loop filter 814, frequency divider 816, and auto-calibration circuit 817 via signal paths 834, 836 and 838, respectively. The phase detector 812 may be in signal communication with the loop filter 814, frequency divider 816, and PLL frequency reference 809 via signal paths 840, 842, and 844, respectively. Similar to FIGS. 4, 5, and 7, in this implementation example the auto-calibration circuit 817 produces two control words: a first control word 846 is sent to the VCO 818 and a second control word 848 is sent to the auto-tuned RF filter 802. Also similar to FIGS. 2, 4, 5, and 7, the loop filter 814 produces a voltage tuned signal vtune 850 via signal path 852.

In this example, the tuning voltage 822 (produced by the loop filter 814) may be adjusted in offset and slope by the scaling circuit 820 (inserted between signal path 822 and 824) to produce a scaled tuning signal (which is a voltage signal that is referred to herein as "scaled vtune") 852. The circuit may be digitally controlled via the serial port interface ("SPI") (not shown). As an example, the control settings may be determined during chip validation and then fixed for production.

Because the VCO 818 and auto-tuned RF filter 802 circuits may be somewhat different, this implementation example allows a single tuning mechanism for both the VCO 818 and the auto-tuned RF filter 802 in the case of a mismatched tuning slope and mismatched tuning offset between the VCO 818 and the auto-tuned RF filter 802.

Again, it is appreciated by those skilled in the art that similar to FIG. 6, the auto-tuned RF filter 802 may be split into two auto-tuned RF filters (not shown) where the first auto-tuned RF filter (not shown) is integrated into the LNA 804 and the second auto-tuned RF filter (not shown) is integrated into the optional RF amplifier 806. If only one auto-tuned filter is used it may be either the auto-tuned RF filter integrated into the LNA 804 or the auto-tuned RF filter integrated in the optional RF amplifier 806.

Additionally, the first auto-tuned RF filter (not shown) and the second auto-tuned RF filter (not shown) may receive the scaled vtune 852 via signal path 824. As discussed above in the description of FIGS. 5 and 6, scaled vtune 852, and/or a control word 848 may be used based on the desired method of operation of the RSFIC 800.

Figure 9:
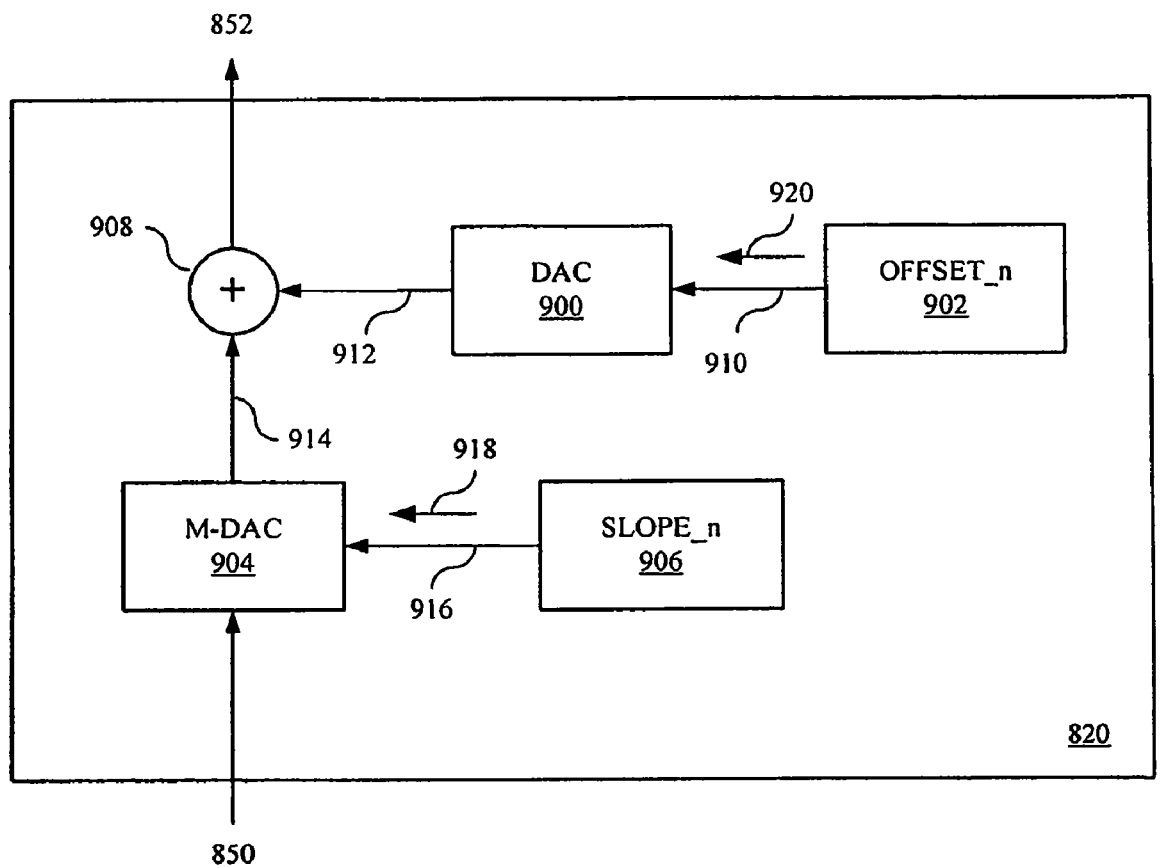
FIG. 9 is a block diagram of an example of an implementation of the scaling circuit shown in FIG. 8 in accordance with the invention.

In FIG. 9, a block diagram of an example of an implementation of a scaling circuit 820 is shown. The scaling circuit 820 may include digital-to-analog converter ("DAC") 900, and OFFSET_n circuit 902, a multiplying DAC ("M-DAC") 904, a SLOPE_n circuit 906, and an adder 908. The DAC 900 is in signal communication with both the OFFSET_n circuit 902 and adder 908 via signal paths 910 and 912, respectively. The M-DAC 904 may be in signal communication with both the adder 908 and SLOPE_n circuit 906 via signal paths 914 and 916, respectively.

In an example of operation, the M-DAC 904 receives the tuning signal vtune 850 from the loop filter 814. The scaled tuning signal (i.e., scaled vtune) 852 is the output from the scaling circuit 820, to be used for RF tuning the auto-tuned RF filter 802. The value of vtune 850 may be modified in two ways by the scaling circuit 820. The first way is to change the slope of vtune 850 by changing the slope with a Slope_n word 918 produced by the SLOPE_n circuit 906 and processed by the M-DAC 904. The second way is to change the offset of vtune 850 by the OFFSET_n word 920 produced by the OFFSET_n circuit 902 that is processed by the DAC 900 and adder 908. As a result, the scaling circuit 820 can help correct for an arbitrary first order (offset and slope) error between the signal generated by the loop filter 814 and the signal needed by the auto-tuned RF Filter 802 to allow it to tune correctly.

Figure 10:
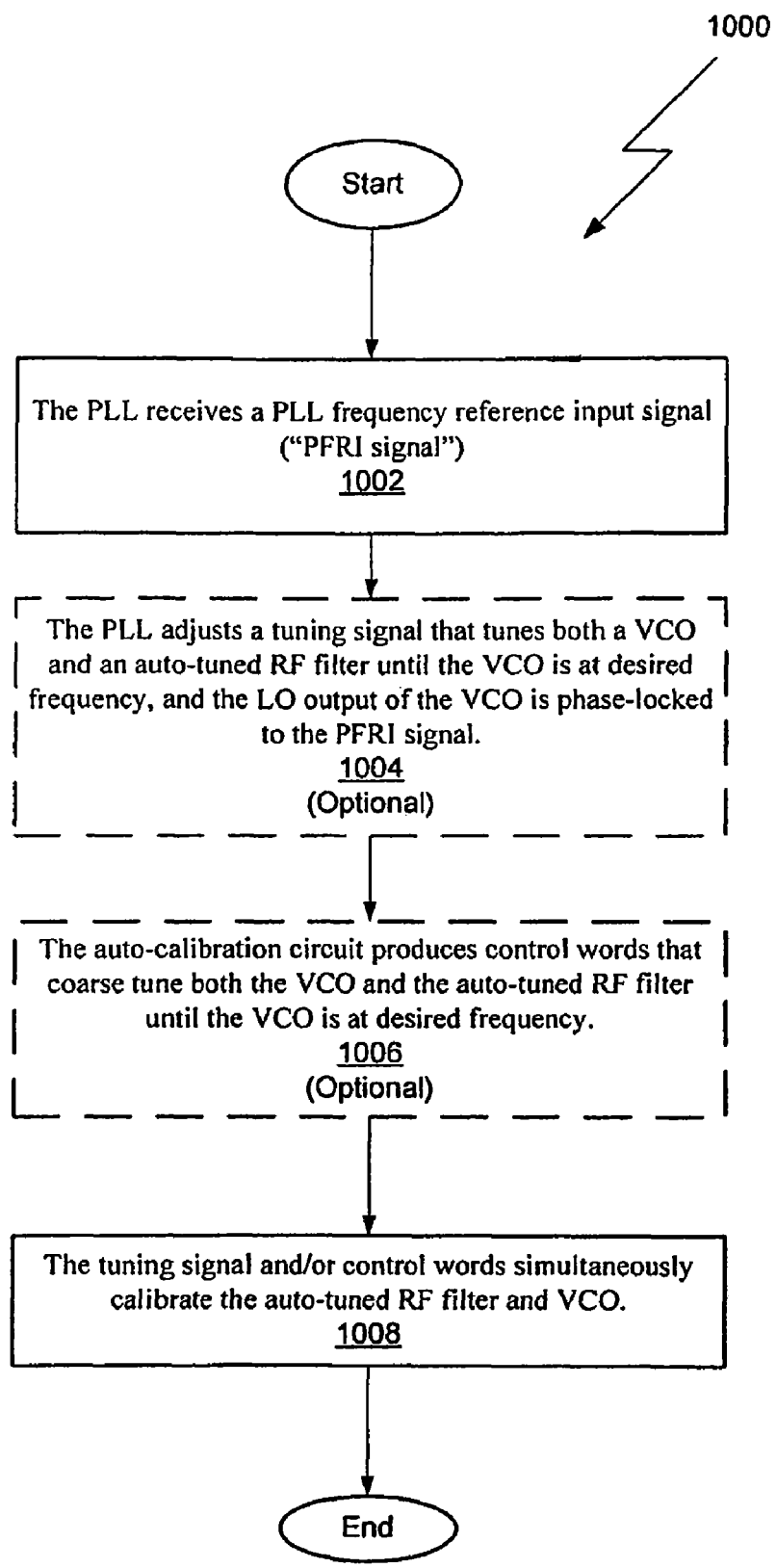
FIG. 10 is a flowchart of an example of an implementation of a method performed by the operation of the RFSIC shown in FIGS. 4, 5, 7, and 8 in accordance with the invention.

In FIG. 10, a flowchart 1000 is shown that illustrates an example method performed by the RFSIC of FIGS. 4, 5, 7, and 8 in operation. In this example, the method begins in step 1002 where the PLL receives the PFRI signal. The method follows one of three options that includes auto-tuning the auto-tuned RF filter with only the voltage tuning signal, auto-tuning and calibrating the auto-tuned RF filter with both the voltage tuning signal and a control word from the auto-calibration circuit, or auto-tuning the auto-tuned RF filter with only the control word. As such, in this example method steps 1004 and 1006 are optional in that only one of the two steps needs to be performed; however, if desired (as explained above), both steps may be performed.

In optional step 1004, the PLL adjusts the tuning signal until the VCO is at a desired frequency, and the LO output produced by the VCO is phase-locked to the PFRI signal. In optional step 1006, the auto-calibration circuit produces control words that coarse tune both the VCO and the auto-tuned RF filter until the VCO tuning range is centered with the tuning voltage close to the optimal value. In step 1008, the tuning signal and/or control words simultaneously calibrate the auto-tuned RF filter and VCO based on which of the three options of the method are desired. The process then ends.

Figure 11:
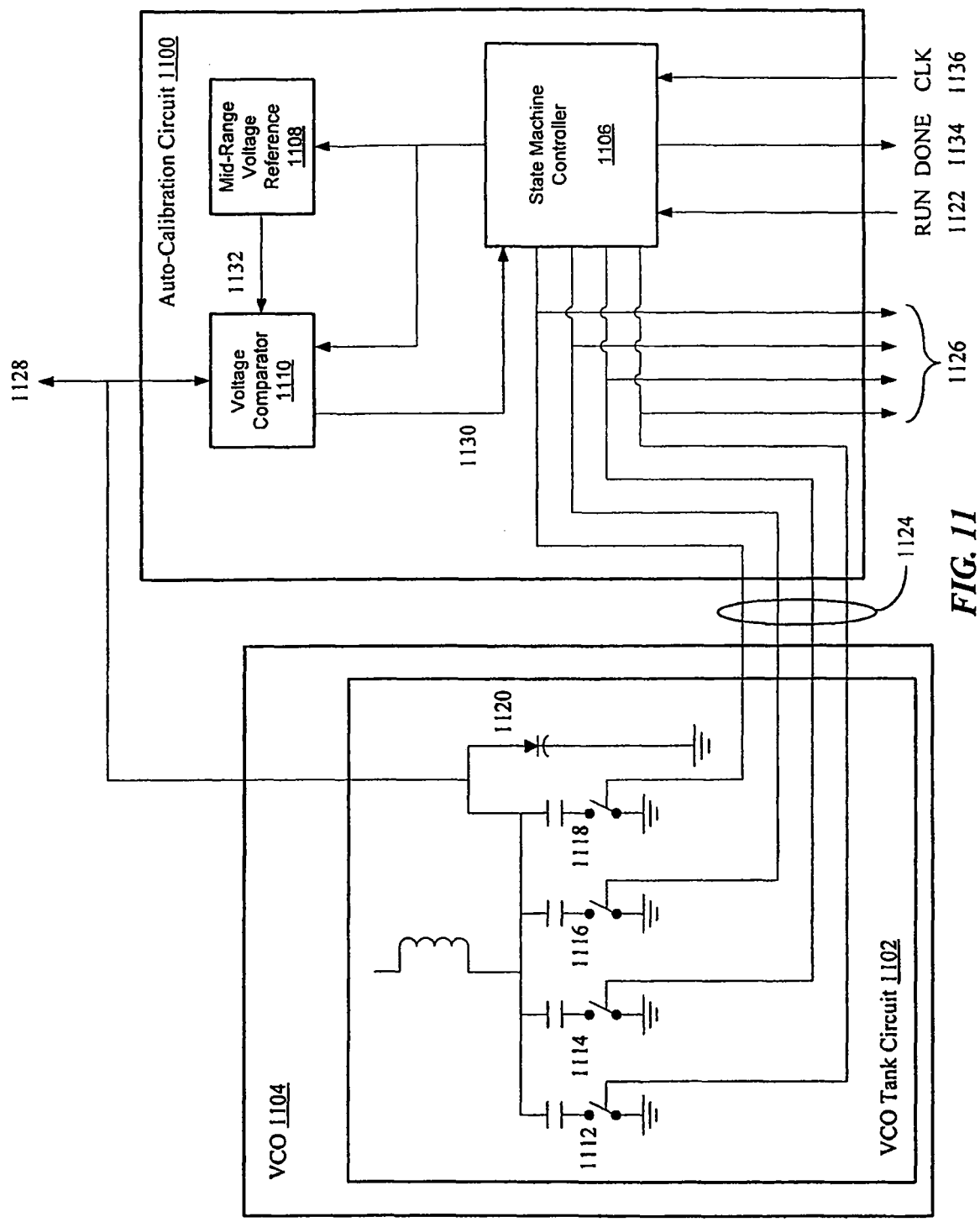
FIG. 11 is a block diagram of an example of an implementation of an auto calibration circuit as shown in FIGS. 4, 5, 7, and 8 in accordance with the invention.

In FIG. 11, a block diagram of an example of an implementation of an auto calibration circuit 1100 as shown in FIGS. 4, 5, 7, and 8 is described. The auto-calibration circuit 1100 may be in signal communication with a VCO tank circuit 1102 within the VCO 1104. The auto-calibration circuit 1100 may include a state machine controller 1106, mid-range voltage reference 1108, and a voltage comparator 1110.

The VCO tank circuit 1102 may include a bank of fixed switched capacitors such as, for example, first switched capacitor 1112 having capacitive value C, second switched capacitor 1114 having capacitive value C/2, third switched capacitor 1116 having capacitive value C/4, fourth switched capacitor 1118 having capacitive value C/8 1118, and a varactor 1120. The plurality of switched capacitors 1112, 1114, 1116, and 1118 are configured to provide a digital frequency tuning capability for the VCO tank circuit 1102. The varactor 1120 is configured to provide analog fine tuning capability for the VCO tank circuit 1102 that is larger than the smallest step size between the plurality of switched capacitors 1112, 1114, 1116, and 1118. As such, all possible values of C sufficient to allow the PLL to phase lock under all conditions of process, power supply voltage and temperature are available. The fixed switched capacitors 1112, 1114, 1116, and 1118 allow the VCO tank circuit 1102 to adjust the VCO 1104 for IC process variations, which may be done at power-up, and for variations over temperature and power supply voltage if the system allows to repeat the auto-calibration process at intervals. In general, the objective is to design a switching scheme so that the digital values of the VCO tank circuit 1102 remain fixed during the system operation, and they are adjusted before the normal system function begins.

The state machine controller 1106 is in signal communication with the VCO tank circuit 1102, mid-range voltage reference 1108, and voltage comparator 1110. In an example of operation, the state machine controller 1106 when commanded to run, via RUN input 1122, will change the plurality of switched capacitors 1112, 1114, 1116, and 1118, respectively (via signal path 1124), until the auto-calibration circuit 1100 determines that the combination of ON/OFF digital calibration signals 1126 result in a VCO tuning voltage signal 1128 that is as close to the middle of the tuning range as possible. The auto-calibration circuit 1100 determines that the combination of ON/OFF digital calibration signals (which is also the digital calibration signal 1126 that is used as a control word signal) is as close to the middle as possible when the state machine controller 1106 receives a comparator voltage signal 1130 from the voltage comparator 1110. The comparator voltage signal 1130 is produced by the voltage comparator 1110 in response to comparing a voltage reference signal 1132 (from the mid-range voltage reference 1108)

with the VCO tuning voltage signal 1128. As an example, the comparator voltage signal 1130 may be a 1-bit digital signal. The state machine controller 1106 produces a DONE output signal 1134 in response to the comparator voltage signal 1130 indicating that the comparator voltage signal 1128 is sufficiently close to the voltage reference signal 1132. A clock ("CLK") input 1136 allows the state machine controller 1106 to step through the various possible combinations of switching the plurality of switched capacitors 1112, 1114, 1116, and 1118. Once the combination of switch settings is determined, the digital calibration signal 1126 is used as the control word signal that may be passed to both the VCO tank circuit 1102 and the auto-tuned RF filter (not shown).

While various embodiments of the invention have been described, it will be apparent to those of ordinary skill in the art that many more embodiments and implementations are possible within the scope of this invention. Moreover, it will be understood that the foregoing description of numerous implementations has been presented for purposes of illustration and description. It is not exhaustive and does not limit the claimed inventions to the precise forms disclosed. Modifications and variations are possible in light of the above description or may be acquired from practicing the invention. The claims and their equivalents define the scope of the invention. Accordingly, the invention is not to be restricted except in light of the attached claims and their equivalents.

What is claimed is:

1. A method for auto-calibrating a frequency response of a Radio Frequency Filter ("auto-tuned RF filter") on a Radio Frequency Single Integrated Circuit ("RFSIC"), wherein the RFSIC includes a phase-locked loop ("PLL") and an auto-calibration circuit, the method comprising:
   receiving a control word from the auto-calibration circuit; and
   auto-calibrating the frequency response of the auto-tuned RF filter with the control word.

2. The method of claim 1, wherein the PLL includes a voltage controlled oscillator (VCO) having a VCO tank circuit and the VCO tank circuit receives a further control word from the auto-calibration circuit.

3. A method for auto-calibrating a frequency response of a Radio Frequency Filter ("auto-tuned RF filter") having digitally switched frequency adjustment components that allow the adjustment of a frequency response characteristic of the auto-tuned RF filter on a Radio Frequency Single Integrated Circuit ("RFSIC"), wherein the RFSIC includes an auto-calibration circuit, the method comprising:
   receiving a control word from the auto-calibration circuit; and
   digitally switching the frequency adjustment components of the auto-tuned RF filter to tune the frequency response characteristic of the auto-tuned RF filter responsive to the control word.

4. The method of claim 3, wherein RFSIC further includes a phase-locked loop (PLL), the auto-tuned RF filter further includes an analog frequency adjustment component and the method further includes:
   receiving a control signal from the PLL; and
   applying the control signal to the analog frequency adjustment component to further adjust the frequency response characteristic of the auto-tuned RF filter.

5. The method of claim 3, further including receiving the control word from the auto-calibration circuit upon start-up of the RFSIC.

6. The method of claim 3, further including receiving the control word from the auto-calibration circuit upon the occurrence of a predetermined event requiring recalibration of the auto-tuned RF filter.

7. The method of claim 6, wherein the predetermined event includes a change in one of operating temperature and power supply voltage.

8. The method of claim 3, wherein the RFSIC further includes a voltage-controlled oscillator (VCO) and the method further includes receiving, at the VCO, a further control word from the auto-calibration circuit to tune the VCO.

9. The method of claim 8, wherein the control word and the further control word are the same.

10. The method of claim 3, wherein the auto-tuned RF filter includes a plurality of auto-tuned RF filter stages, each stage including respective digitally switched frequency adjustment components and the method includes digitally switching the digitally switched frequency adjustment components in each of the plurality of auto-tuned RF filter stages responsive to the control word.

11. A Radio Frequency Single Integrated Circuit ("RFSIC") comprising:
   a radio-frequency (RF) filter including digitally switched frequency adjustment components that allow the adjustment of a frequency response characteristic of the RF filter in response to a control word; and
   an autocalibration circuit coupled to the digitally switched frequency adjustment components and coupled to receive a reference signal, the autocalibration circuit including:
      a comparator coupled to the reference signal and to a signal produced by the digitally switched frequency adjustment components; and
      a state machine, coupled to the comparator and configured to step through successive values for the control word until the comparator indicates that the signal produced by the digitally switched frequency adjustment components corresponds to the control signal.

12. The RFSIC of claim 11, wherein the RF filter includes:
   an amplifier; and
   a tank circuit coupled to the amplifier as a load, the tank circuit including a plurality of capacitors, each capacitor coupled to a digitally controlled switch to be selectively placed in parallel with other ones of the plurality of capacitors in response to a respective bit of the control word.

13. The RFSIC of claim 12, wherein the tank circuit further includes an inductor connected in series with the plurality of capacitors.

14. The RFSIC of claim 12, wherein the amplifier is a low-noise amplifier (LNA).

15. The RFSIC of claim 11, wherein the RF filter includes a plurality of cascade-connected RF filter units, each RF filter unit coupled to receive a respective control word from the autocalibration circuit, each RF filter unit including:
   an amplifier; and
   a tank circuit coupled to the amplifier as a load, the tank circuit including a plurality of capacitors, each capacitor coupled to a digitally controlled switch to be selectively placed in parallel with other ones of the plurality of capacitors in response to a respective bit of the respective control word.

16. The RFSIC of claim 11, wherein the RF filter includes a plurality of cascade-connected RF filter units, each RF filter unit coupled to receive a respective control word from the autocalibration circuit, wherein:

a first RF filter unit of the plurality of RF filter units includes:
  an amplifier; and
  a tank circuit coupled to the amplifier as a load, the tank circuit including a plurality of capacitors, each capacitor coupled to a digitally controlled switch to be selectively placed in parallel with other ones of the plurality of capacitors in response to a respective bit of the respective control word; and
a second RF filter unit of the plurality of RF filter units includes:
  an further amplifier; and
  a further tank circuit, coupled to the amplifier as an input matching circuit, the tank circuit including a plurality of capacitors, each capacitor coupled to a digitally controlled switch to be selectively placed in parallel with other ones of the plurality of capacitors in response to a respective bit of the respective control word.

17. The RFSIC of claim 11 wherein the RF filter further includes:
  an analog frequency adjustment component, coupled to the digitally switched frequency adjustment components, the analog frequency adjustment component being responsive to a control signal to further adjust the frequency response characteristic of the RF filter.

18. The RFSIC of claim 17, further comprising a phase-locked-loop (PLL) including a voltage-controlled oscillator (VCO), a phase detector and a loop filter, wherein:
  the loop filter is configured to generate the control signal;
  the VCO is coupled to receive the control word from the autocalibration circuit and the control signal to lock the PLL to a frequency reference signal.

19. The RFSIC of claim 18, wherein the RF filter further includes a scaling circuit coupled to receive the control signal, to adjust the control signal in magnitude and to apply the adjusted control signal to the analog frequency adjustment component.

20. The RFSIC of claim 18, wherein the analog frequency adjustment component is a varactor diode.

* * * * *